(12) United States Patent
Sanghvi

(10) Patent No.: US 11,348,415 B2
(45) Date of Patent: May 31, 2022

(54) COGNITIVE AUTOMATION PLATFORM FOR PROVIDING ENHANCED AUTOMATED TELLER MACHINE (ATM) SECURITY

(71) Applicant: Bank of America Corporation, Charlotte, NC (US)

(72) Inventor: Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/834,107

(22) Filed: Mar. 30, 2020

(65) Prior Publication Data

US 2021/0304571 A1 Sep. 30, 2021

(51) Int. Cl.
- *G06Q 40/02* (2012.01)
- *G07F 19/00* (2006.01)
- *G08B 13/196* (2006.01)
- *G08B 25/00* (2006.01)
- *G06V 20/52* (2022.01)

(52) U.S. Cl.
CPC ............ *G07F 19/207* (2013.01); *G06V 20/52* (2022.01); *G07F 19/209* (2013.01); *G08B 13/19613* (2013.01); *G08B 25/00* (2013.01)

(58) Field of Classification Search
CPC . G07F 19/207; G07F 19/209; G06K 9/00771; G08B 13/19613; G08B 25/00; G06Q 20/4016; G06Q 40/02; G06Q 30/0185; G06Q 20/4014; G06Q 20/1085
See application file for complete search history.

(56) References Cited

U.S. PATENT DOCUMENTS

| | | | |
|---|---|---|---|
| 5,155,803 A | | 10/1992 | Barabash et al. |
| 10,769,896 B1 * | | 9/2020 | Farivar ................. G08B 3/10 |
| 11,042,850 B2 * | | 6/2021 | Lucia Specogna .. G06Q 20/385 |
| 2006/0028341 A1 | | 2/2006 | Bartholf et al. |
| 2007/0112696 A1 | | 5/2007 | Vane et al. |
| 2008/0070217 A1 | | 3/2008 | Lopez et al. |
| 2008/0191860 A1 | | 8/2008 | Flook et al. |
| 2008/0251578 A1 | | 10/2008 | Jansing |
| 2010/0025463 A1 | | 2/2010 | Daroga |
| 2012/0038774 A1 * | | 2/2012 | Reimann ............... G07F 19/207 348/150 |

(Continued)

OTHER PUBLICATIONS

David Schatsky et al. "Robotic process automation: A path to the cognitive enterprise" Deloitte University Press, Signals for Strategists, 2016 Deloitte Development LLC, pp. 1-10.

*Primary Examiner* — Patrick E Demosky
(74) *Attorney, Agent, or Firm* — Banner & Witcoff, Ltd.

(57) ABSTRACT

Aspects of the disclosure relate to using cognitive automation for enhanced ATM security. A computing platform may receive, from a first automated teller machine (ATM), first ATM information indicating a first interaction between a user and the first ATM. The computing platform may receive, from a first camera, a first image, which may show the user performing the first interaction with the first ATM. Based on the first ATM information and the first image, the computing platform may determine that the first ATM is experiencing malicious activity. The computing platform may send, to a second ATM, one or more commands directing the second ATM to perform a first security action, which may cause the second ATM to perform the first security action.

18 Claims, 11 Drawing Sheets

(56) References Cited

U.S. PATENT DOCUMENTS

| | | |
|---|---|---|
| 2012/0097404 A1 | 4/2012 | Staines |
| 2012/0330869 A1 | 12/2012 | Durham |
| 2014/0305352 A1* | 10/2014 | Dowling .................. G07C 9/27 109/38 |
| 2014/0320664 A1* | 10/2014 | Hyun ................ H04N 5/23296 348/159 |
| 2015/0355649 A1 | 12/2015 | Ovadia |
| 2016/0148179 A1* | 5/2016 | James ................... G07F 19/209 705/43 |
| 2017/0255671 A1 | 9/2017 | Christian et al. |
| 2018/0204204 A1* | 7/2018 | Giraudo ............. G06Q 30/0633 |
| 2018/0239377 A1 | 8/2018 | Ovadia |
| 2018/0365617 A1 | 12/2018 | Ghosh et al. |
| 2019/0220863 A1* | 7/2019 | Novick ............... H04W 12/122 |
| 2019/0244149 A1 | 8/2019 | Krishnaswamy |
| 2019/0306011 A1 | 10/2019 | Fenoglio et al. |
| 2019/0347282 A1 | 11/2019 | Cai et al. |
| 2019/0349321 A1 | 11/2019 | Cai et al. |
| 2020/0005616 A1* | 1/2020 | Pham ......................... G07F 7/10 |
| 2020/0022016 A1 | 1/2020 | Fenoglio et al. |
| 2020/0097357 A1 | 3/2020 | Shwartz et al. |
| 2021/0192523 A1* | 6/2021 | Pham ................ G06Q 20/4016 |

\* cited by examiner

305

ATM Interface

$5

Is this the correct amount that you would like to withdraw?

Yes   No

ATM Interface

Transaction Error. Please try your transaction again.

Teller Interface

Tampering has been detected with ATM #1. Several security options are presented below:

| Notify Authority | View Image |

FIG. 5

COGNITIVE AUTOMATION PLATFORM FOR PROVIDING ENHANCED AUTOMATED TELLER MACHINE (ATM) SECURITY

BACKGROUND

Aspects of the disclosure relate to automated teller machine (ATM) security. In particular, one or more aspects of the disclosure relate to computing platforms that apply cognitive automation technology to securing ATMs.

In some cases, enterprise organizations such as financial institutions may deploy ATMs to allow customers to perform basic financial tasks (e.g., deposits, withdrawals, funds transfers, or the like). In some instances, individuals may tamper with these ATMs, and such tampering may remain undetected due to the automated, standalone nature of the ATMs. Furthermore, ATMs may operate as isolated units and might not communicate with each other. This configuration may increase the risk of issues such as undetected tampering and/or repeated tampering at additional ATMs, which in turn may result in processing inefficiencies and/or security threats for financial institutions that operate and/or otherwise utilize ATMs.

SUMMARY

Aspects of the disclosure provide effective, efficient, scalable, and convenient technical solutions that address and overcome the technical problems associated with ATM security. For example, some aspects of the disclosure provide techniques that may enable computing platforms to apply cognitive automation technology to enhance ATM security by monitoring and analyzing interaction patterns at the ATMs to identify malicious activity. The computing platforms may share malicious interaction patterns and/or images of malicious actors to facilitate identification and/or execution of various responsive actions.

Accordingly, by performing the one or more methods described herein, one or more technical advantages may be realized. For example, one technical advantage of using cognitive automation in ATM security is that such techniques may expedite computing methods that enable identification of malicious interactions. This approach may notify other ATMs of identified tampering and image data corresponding to the malicious user. Accordingly, subsequently-attacked ATMs and/or a central server receiving data from such subsequently-attacked ATMs may avoid expending time and computing resources to classify an interaction as malicious. Rather, the subsequently-attacked ATM may simply capture an image of an interaction at the subsequent ATM, perform an image comparison to identify that a user identified at the subsequently-attacked ATM was previously identified as tampering with another ATM, and perform necessary security measures if the comparison yields a match.

In accordance with one or more embodiments of the disclosure, a computing platform comprising at least one processor, a communication interface, and memory storing computer-readable instructions may receive, from a first automated teller machine (ATM), first ATM information indicating a first interaction between a user and the first ATM. The computing platform may receive, from a first camera, a first image showing the user performing the first interaction with the first ATM. Based on the first ATM information and the first image, the computing platform may determine that the first ATM is experiencing malicious activity. The computing platform may send, to a second ATM, one or more commands directing the second ATM to perform a first security action, which may cause the second ATM to perform the first security action.

In one or more embodiments, the computing platform may receive, from the second ATM, second ATM information indicating a second interaction between the user and the second ATM. The computing platform may receive, from a second camera, a second image showing the user performing the second interaction with the second ATM. The computing platform may compare the first image to the second image, which may result in identifying that the user performing the second interaction is the same user that performed the first interaction.

In one or more embodiments, the computing platform may compare the first image to the second image by applying computer vision techniques to identify the user in the first image and the second image. In one or more embodiments, the computing platform may send the one or more commands directing the second ATM to perform the first security action in response to identifying that the user performing the second interaction is the same user that performed the first interaction.

In one or more embodiments, the computing platform may receive the first image concurrently with the first ATM information and the first camera may be located within a predetermined distance of the first ATM. In one or more embodiments, in determining that the first ATM is experiencing malicious activity, the computing platform may determine one or more of: 1) that the first ATM is being physically deconstructed, 2) that the same personal identification number has been used more than a predetermined number of times during a predetermined time period, 3) that the same user interface progression has been accessed at a number of ATMs within a predetermined distance that exceeds a predetermined progression threshold, or 4) that an amount of funds within a predetermined amount of a maximum withdrawal limit has been withdrawn from the number of ATMs within the predetermined distance a number of times that exceeds a predetermined withdrawal threshold.

In one or more embodiments, the computing platform may receive, from a second camera, a second image showing the user performing the first interaction with the first ATM from a different vantage point than the first image, and the computing platform may determine that the first ATM is experiencing malicious activity based in part on the second image. In one or more embodiments, the computing platform may determine that the first ATM is experiencing malicious activity by: 1) comparing the first image to a stored user profile corresponding to a legitimate user, and 2) identifying, based on the comparison of the first image to the stored user profile, that the user is not the legitimate user.

In one or more embodiments, the first security action may be one or more of: 1) notifying law enforcement of the malicious activity, 2) notifying an enterprise user device at a physical branch office of an enterprise organization maintaining the second ATM, 3) causing display of one or more graphical user interfaces to be displayed at the second ATM which may delay the user from completing the malicious activity, or 4) causing a physical perimeter surrounding the second ATM to be locked down. In one or more embodiments, the computing platform may receive, from the first camera, audio data that includes speech from the user performing the first interaction with the first ATM, and the computing platform may determine that the first ATM is experiencing malicious activity by: 1) comparing the audio data a stored user profile corresponding to a legitimate user, and 2) identifying, based on the comparison of the audio data to the stored user profile, that the user is not the legitimate user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3-5 depict illustrative user interfaces for implementing cognitive automation techniques for enhanced ATM security in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively implement cognitive automation for enhanced ATM security. For example, one or more of the systems and methods described herein are directed towards integrating cognitive ability into ATMs to send out fraud alerts to neighboring ATMs when they detect tampering. In these instances, the ATM footage of a suspect may be sent to the neighboring ATMs and used to detect tampering, block access, and/or notify authorities without alerting the suspect.

Accordingly, by performing the one or more methods described herein, one or more technical advantages may be realized. For example, one technical advantage of using cognitive automation in ATM security is that such techniques may expedite computing methods corresponding to identification of malicious interactions. This approach may notify other ATMs of identified malicious interactions and image data corresponding to the malicious user. Accordingly, subsequently attacked ATMs may avoid expending time and computing resources to classify an interaction as malicious. Rather, the subsequent ATM may capture an image of an interaction at the subsequent ATM, compare the image to images from previously attacked ATMs, and perform necessary security measures if the comparison yields a match.

Figure 1A:
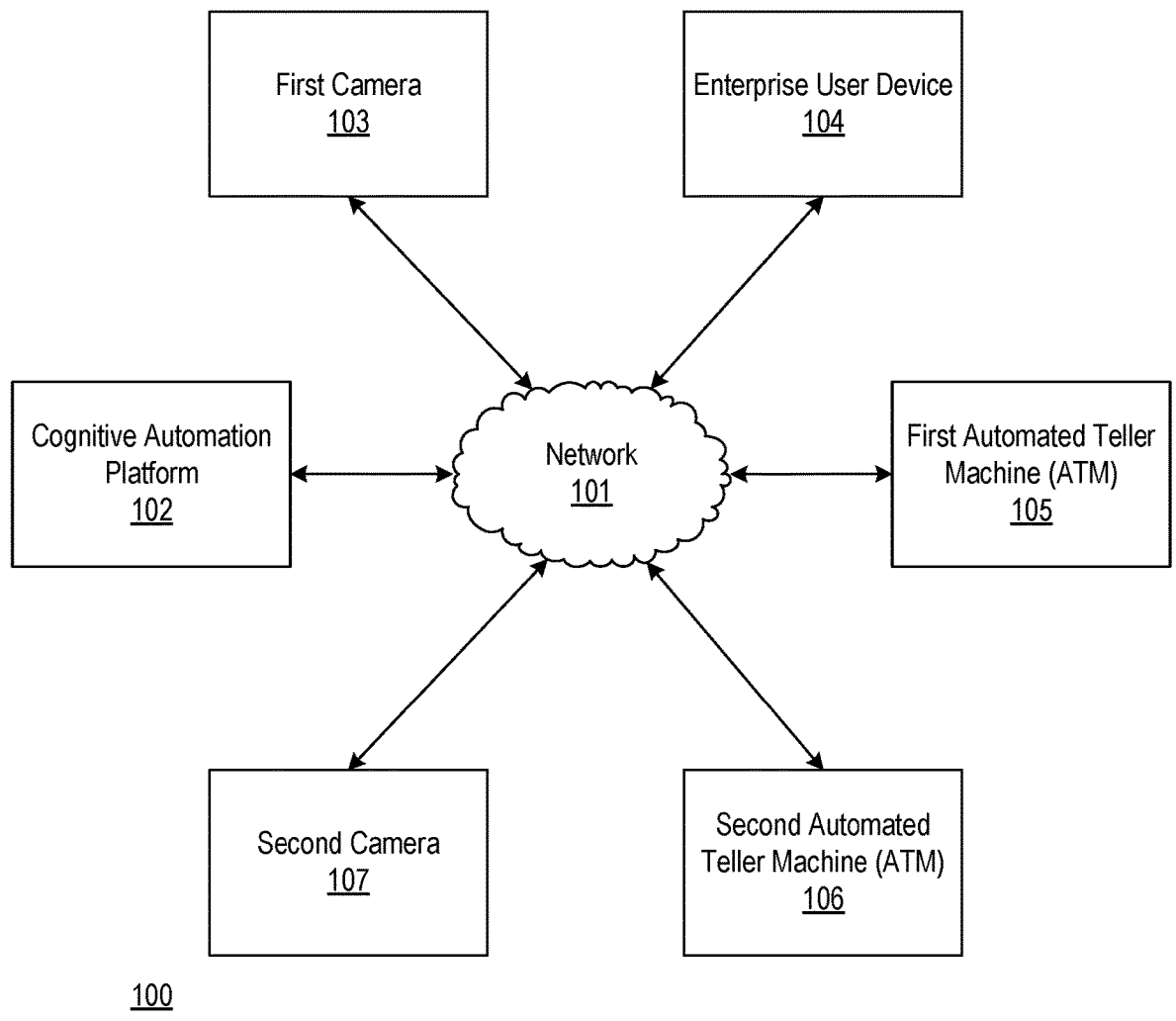
FIGS. 1A-1B depict an illustrative computing environment for implementing cognitive automation techniques for enhanced ATM security in accordance with one or more example embodiments.
Figure 1B:
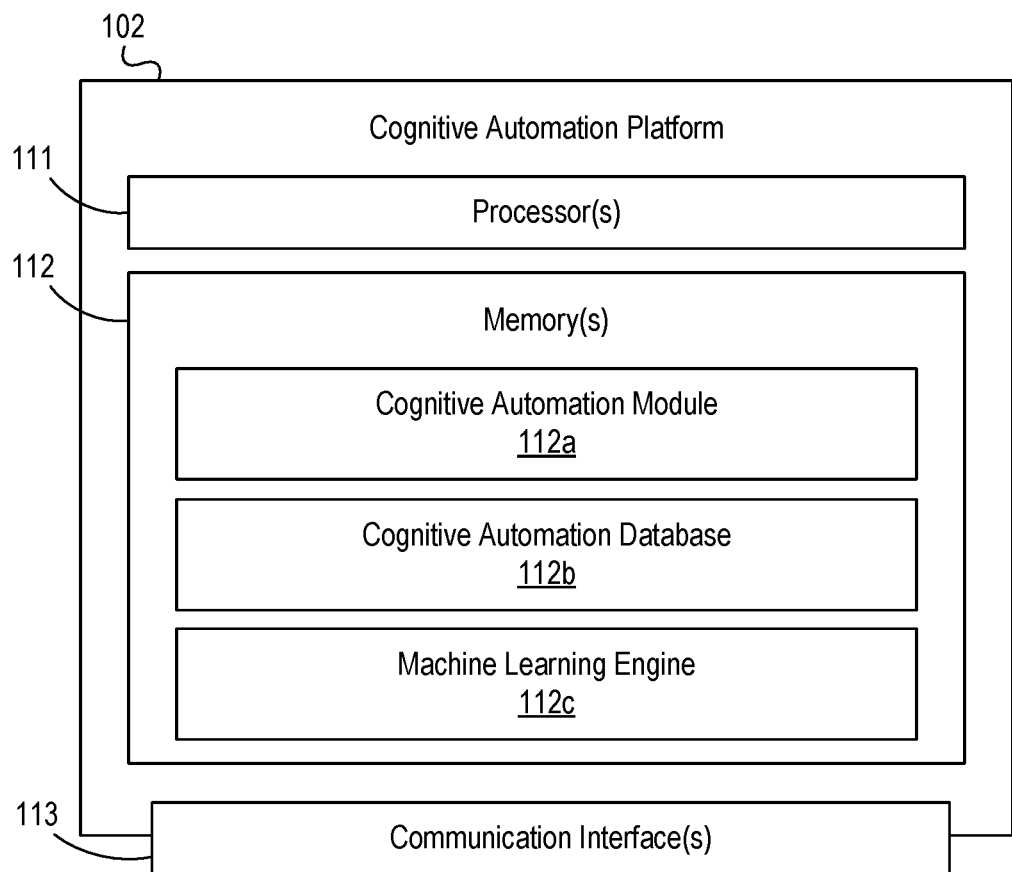

FIGS. 1A-1B depict an illustrative computing environment that implements cognitive automation techniques for enhanced ATM security in accordance with one or more example embodiments. Referring to FIG. 1A, computing environment 100 may include one or more computer systems. For example, computing environment 100 may include a cognitive automation platform 102, first camera 103, enterprise user device 104, first ATM 105, second ATM 106, and second camera 107.

As described further below, cognitive automation platform 102 may be a computer system that includes one or more computing devices (e.g., servers, server blades, or the like) and/or other computer components (e.g., processors, memories, communication interfaces) that may be used to implement cognitive automation, machine learning algorithms, computer vision techniques, artificial intelligence, or the like to identify malicious interactions, recognize users, compare interaction patterns to stored profiles, detect tampering, and direct performance of security actions accordingly. In some instances, the cognitive automation platform 102 may be maintained by an enterprise organization (e.g., a financial institution, or the like) and may be configured to identify malicious interactions based on interaction patterns and/or detected impersonation, and may be configured to cause one or more security measures to be taken in response. In some instances, the cognitive automation platform 102 may be configured to maintain a cognitive automation model that stores correlations between user interaction information, user appearances, and/or voice characteristics, and may be configured to update the cognitive automation model based on received feedback.

First camera 103 may be a camera configured to capture video data, image data, audio data, or the like. In some instances, the first camera 103 may be located within a predetermined distance (e.g., within a kiosk, at a terminal, or the like) of an ATM (e.g., first ATM 105, or the like) and may be configured to collect data corresponding to user interactions with the ATM. In some instances, first camera 103 may be configured to communicate with cognitive automation platform 102, and may send the video data, image data, audio data, or the like accordingly.

Enterprise user device 104 may be a desktop computer, laptop computer, tablet, mobile device, or the like, and may be used by an individual such as an employee of an enterprise organization (e.g., a financial institution, or the like). For example, enterprise user device 104 may be configured to facilitate display of user interfaces (e.g., interfaces that allow the individual to provide financial services at a branch office such as perform withdrawals, deposits, fund transfers or the like). In some instances, enterprise user device 104 may be configured to communicate with cognitive automation platform 102 and may receive one or more alerts and/or notifications accordingly (e.g., notifications regarding malicious interactions with a proximate ATM, or the like).

First ATM 105 may be an ATM used by an individual such as a client of an enterprise organization (e.g., a financial institution, or the like) to perform financial services (e.g., withdrawal, deposit, transfer funds, or the like). In some instances, first ATM 105 may be configured to display or otherwise present one or more graphical user interfaces (e.g., automated teller interfaces) and may be configured to provide interaction information (e.g., withdrawal amounts, accessed accounts, navigation patterns, or the like) to the cognitive automation platform 102. In some instances, interactions with first ATM 105 may be monitored by one or more cameras (e.g., first camera 103, second camera 107, or the like).

Second ATM 106 may be an ATM used by an individual such as a client of an enterprise organization (e.g., a financial institution, or the like) to perform financial services (e.g., withdrawal, deposit, transfer funds, or the like). In some instances, second ATM 106 may be configured to display or otherwise present one or more graphical user interfaces (e.g., automated teller interfaces) and may be configured to provide interaction information (e.g., withdrawal amounts, accessed accounts, navigation patterns, or the like) to the cognitive automation platform 102. In some instances, second ATM 106 may be located within a predetermined distance of the first ATM 105 (e.g., within a bank of ATMs inside a kiosk, inside a lobby of a financial center, at a drive-through, outside of a financial center, or the like) or may be located at a different location. In some instances, first ATM 105 and second ATM 106 may be maintained by the same or different enterprise organizations. In some instances, interactions with first ATM 105 may be monitored by one or more cameras (e.g., first camera 103, second camera 107, or the like).

Second camera 107 may be a camera configured to capture video data, image data, audio data, or the like. In some instances, the second camera 107 may be located within a predetermined distance (e.g., within a kiosk, at a terminal, or the like) of an ATM (e.g., first ATM 105, second ATM 106 or the like) and may be configured to collect data corresponding to user interactions with the ATM. In these instances, the second camera 107 may be configured to capture a different vantage point of users interacting with the first ATM 105 than is captured by first camera 103. Additionally or alternatively, the second ATM 106 may be configured to capture users interacting with the second ATM 106. In some instances, second camera 107 may be configured to communicate with cognitive automation platform 102, and may send the video data, image data, audio data, or the like accordingly.

Computing environment 100 also may include one or more networks, which may interconnect cognitive automation platform 102, first camera 103, enterprise user device 104, first ATM 105, second ATM 106, second camera 107, or the like. For example, computing environment 100 may include a network 101 (which may interconnect, e.g., cognitive automation platform 102, first camera 103, enterprise user device 104, first ATM 105, second ATM 106, second camera 107, or the like).

In one or more arrangements, cognitive automation platform 102, first camera 103, enterprise user device 104, first ATM 105, second ATM 106, and second camera 107 may be any type of computing device capable of sending and/or receiving requests and processing the requests accordingly. For example, cognitive automation platform 102, first camera 103, enterprise user device 104, first ATM 105, second ATM 106, second camera 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cognitive automation platform 102, first camera 103, enterprise user device 104, first ATM 105, second ATM 106, and/or second camera 107 may, in some instances, be special-purpose computing devices configured to perform specific functions.

Referring to FIG. 1B, cognitive automation platform 102 may include one or more processors 111, memory 112, and communication interface 113. A data bus may interconnect processor 111, memory 112, and communication interface 113. Communication interface 113 may be a network interface configured to support communication between cognitive automation platform 102 and one or more networks (e.g., network 101, or the like). Memory 112 may include one or more program modules having instructions that when executed by processor 111 cause cognitive automation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of cognitive automation platform 102 and/or by different computing devices that may form and/or otherwise make up cognitive automation platform 102. For example, memory 112 may have, host, store, and/or include cognitive automation module 112a, cognitive automation database 112b, and a machine learning engine 112c.

Cognitive automation module 112a may have instructions that direct and/or cause cognitive automation platform 102 to execute advanced cognitive automation techniques related to ATM security, as discussed in greater detail below. Cognitive automation database 112b may store information used by cognitive automation module 112a and/or cognitive automation platform 102 in application of cognitive automation techniques related to ATM security, and/or in performing other functions. Machine learning engine 112c may have instructions that direct and/or cause the cognitive automation platform 102 to set, define, and/or iteratively refine optimization rules and/or other parameters used by the cognitive automation platform 102 and/or other systems in computing environment 100.

Figure 2A:
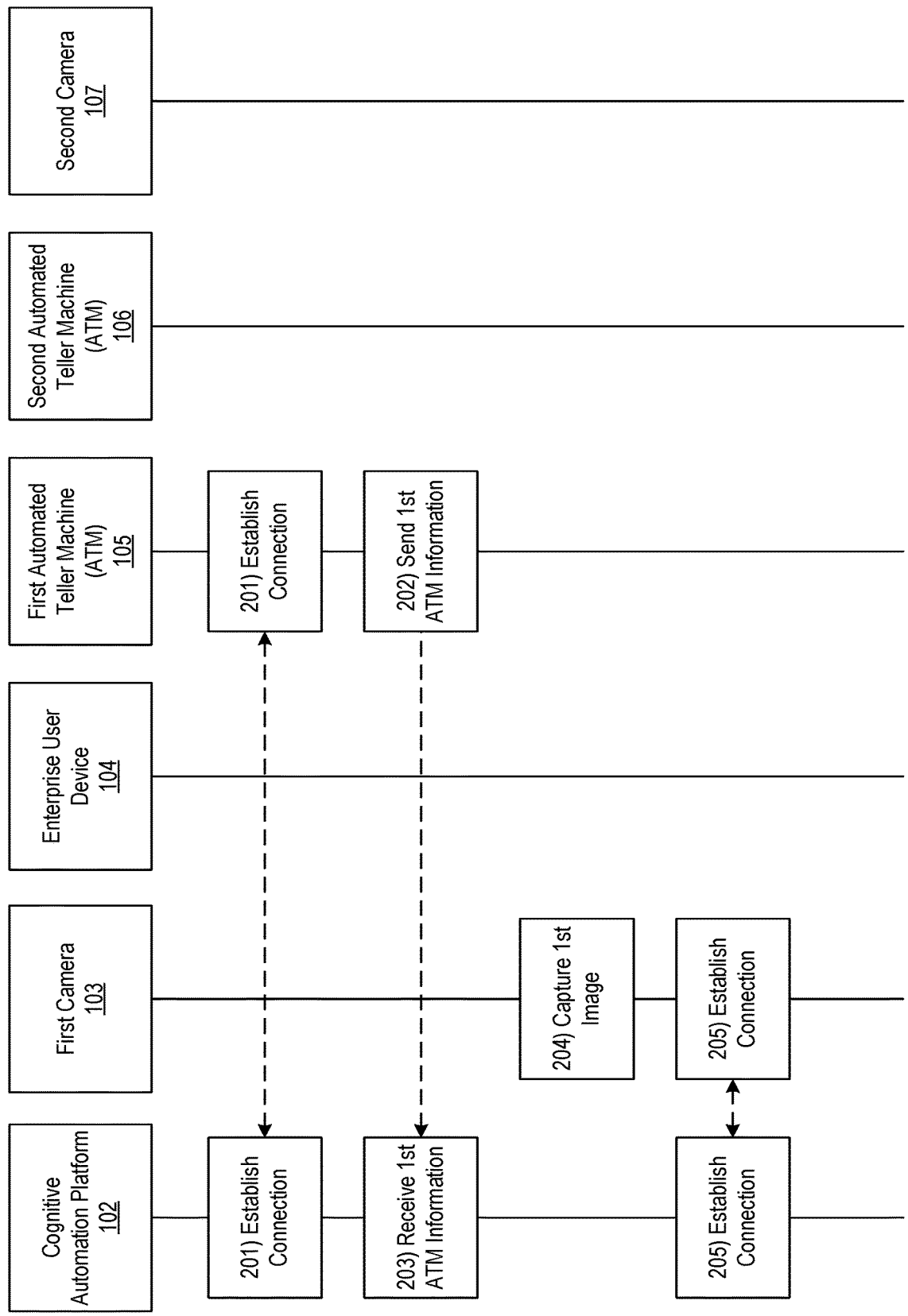
FIGS. 2A-2F depict an illustrative event sequence for implementing cognitive automation techniques for enhanced ATM security in accordance with one or more example embodiments.

FIGS. 2A-2F depict an illustrative event sequence that implements cognitive automation for enhanced ATM security in accordance with one or more example embodiments. Referring to FIG. 2A, at step 201, first ATM 105 may establish a connection with cognitive automation platform 102. In some instances, first ATM 105 may establish a first wireless data connection with the cognitive automation platform 102 to link the first ATM 105 to the cognitive automation platform 102. In some instances, the first ATM 105 may identify whether a connection is already established with the cognitive automation platform 102. If a connection is already established, the first ATM 105 might not re-establish the connection with the cognitive automation platform 102.

At step 202, the first ATM 105 may send first ATM interaction information to the cognitive automation platform 102. For example, a first user may interact with the first ATM 105, and the first ATM 105 may send information corresponding to the interaction to the cognitive automation platform 102. In some instances, the first ATM 105 may send the first ATM interaction information to the cognitive automation platform 102 while the first wireless data connection is established. In some instances, in sending the first ATM interaction information, the first ATM 105 may send sensor information (e.g., indicating that the first ATM is being physically tampered with and/or deconstructed, that a card has been inserted (which may, e.g., be a genuine ATM card or a fake ATM card), that a universal serial bus (USB) device has been inserted, that a card skimmer has been installed, or the like), account information (e.g., a personal identification number (PIN) received), a user interface progression (e.g., user inputs received to move through a decision tree at the first ATM 105 to perform a particular action), an amount of funds withdrawn, a message indicating that software is being modified, biometric data, or the like.

At step 203, the cognitive automation platform 102 may receive the first ATM interaction information that was sent at step 202. In some instances, the cognitive automation platform 102 may receive the first ATM interaction information via the communication interface 113 and while the first wireless data connection is established. In some instances, in receiving the first ATM interaction information, the cognitive automation platform 102 may receive sensor information (e.g., indicating that the first ATM is being physically tampered with and/or deconstructed, or the like), account information (e.g., a personal identification number (PIN) received), a user interface progression (e.g., user inputs received to move through a decision tree at the first ATM 105 to perform a particular action), an amount of funds withdrawn, or the like.

At step 204, the first camera 103 may capture a first image. In some instances, the first camera 103 may be configured to capture images of a user interacting with the first ATM 105. In some instances, the first camera 103 may capture images at a predetermined interval (e.g., once a minute, or the like). In other instances, the first camera 103 may receive one or more commands from the cognitive automation platform 102, which may indicate that tampering has been detected (e.g., based on the first ATM interaction information, and that an image should be captured). In some instances, the first camera 103 may capture video content, images, audio content, or the like corresponding to the first user. In some instances, the first camera 103 may capture additional images related to the first user (e.g., a driver's license, license plate, or the like).

At step 205, the first camera 103 may establish a connection with the cognitive automation platform 102. For example, the first camera 103 may establish a second wireless data connection with the cognitive automation platform 102 to link the first camera 103 to the cognitive automation platform 102. In some instances, the first camera 103 may identify whether a connection is already established with the cognitive automation platform 102. If a connection is already established with the cognitive automation platform 102, the first camera 103 might not re-establish the connection. If a connection is not already established with the cognitive automation platform 102, first camera 103 may establish the second wireless data connection as described herein.

Figure 2B:
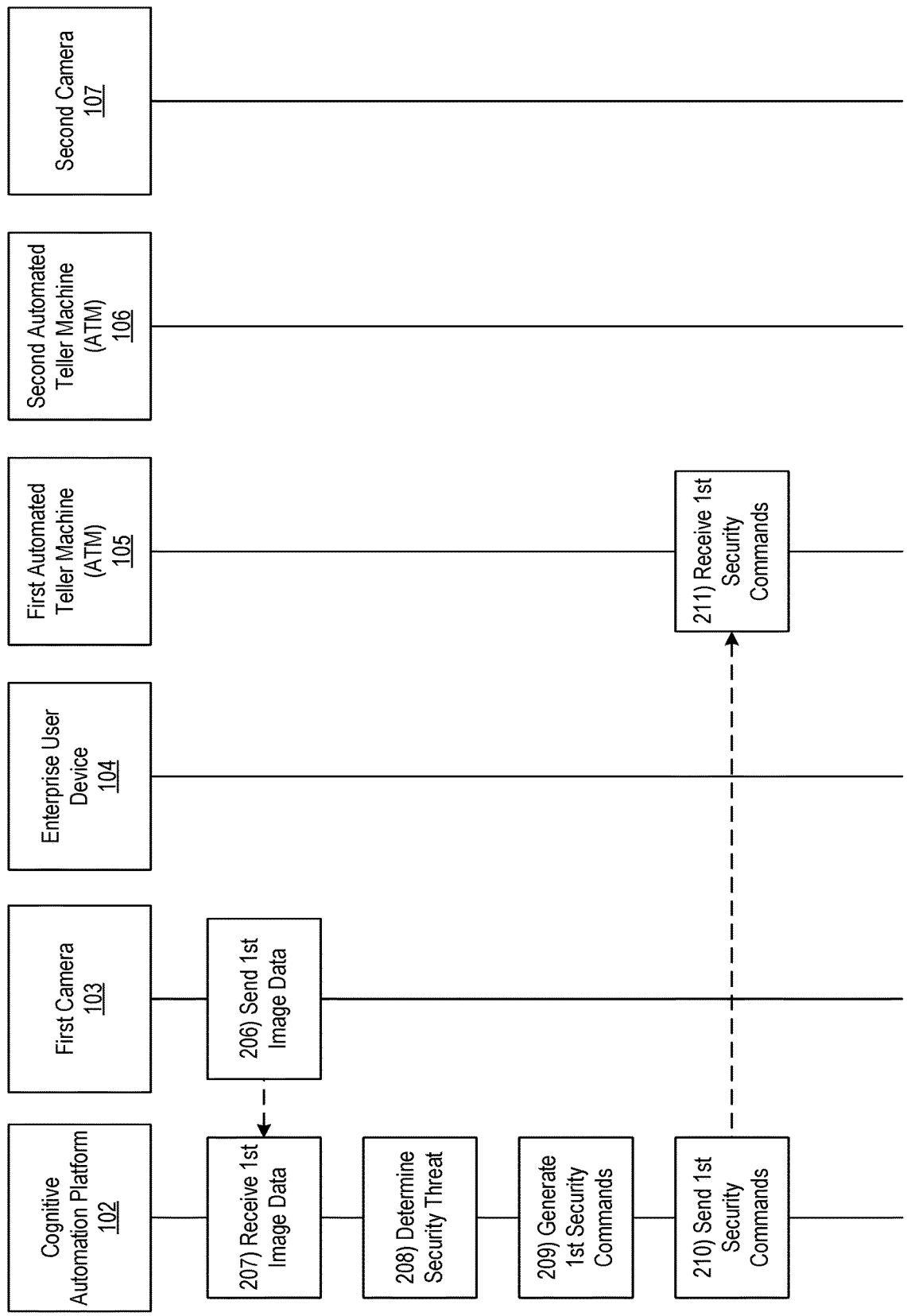

Referring to FIG. 2B, at step 206, the first camera 103 may send first image data to the cognitive automation platform 102. In some instances, the first camera 103 may send the first image data to the cognitive automation platform 102 while the second wireless data connection is established. In some instances, the first camera 103 may send first image data corresponding to the first user interacting with the first ATM 105. In some instances, the first camera 103 may send video data, audio data, image data, or the like to the cognitive automation platform 102. In some instances, in sending the first image data to the cognitive automation platform 102, the first camera 103 may establish a live video stream between the first camera 103 and the cognitive automation platform 102.

At step 207, the cognitive automation platform 102 may receive the first image data sent at step 206. In some instances, the cognitive automation platform 102 may receive the first image data via the communication interface 113 and while the second wireless data connection is established. In some instances, the cognitive automation platform 102 may receive first image data corresponding to the first user interacting with the first ATM 105. In some instances, the cognitive automation platform 102 may receive video data, audio data, image data, or the like from the first camera 103. In some instances, in receiving the first image data, the cognitive automation platform 102 may receive a live video stream from the first camera 103. In some instances, steps 201-207 may occur concurrently (e.g., first ATM interaction information and first image data may be collected and sent to the cognitive automation platform 102 simultaneously). Alternatively, the first image data may be received prior to the first ATM interaction information, and may be used by the cognitive automation platform 102 to identify the first user before he or she begins interacting with the first ATM 105. Furthermore, it should be understood that although a single camera is described, multiple cameras may be implemented to collect images of the first user from multiple vantage points (which may, e.g., subsequently be used for threat identification at step 208).

At step 208, the cognitive automation platform 102 may identify a security threat based on the first ATM interaction information and/or the first image data. In some instances, the cognitive automation platform 102 may apply a cognitive automation model to the first ATM interaction information and/or the first image data to identify the security threat. For example, the cognitive automation platform 102 may maintain a model of known malicious interaction information, and may compare the first ATM interaction information to the known malicious interaction information. For example, the cognitive automation platform 102 may maintain sensor data indicating that a first ATM is being physically tampered with or deconstructed, and may compare the first ATM interaction information to the stored sensor data. Additionally or alternatively, the cognitive automation platform 102 may maintain a threshold value corresponding to a number of times that a PIN number may be used within a predetermined time period in a legitimate manner, and may compare the first ATM interaction information to this threshold value. For example, if the cognitive automation platform 102 determines, based on the first ATM interaction information, that the threshold value is exceeded, the cognitive automation platform 102 may identify a security threat (e.g., a malicious user is entering the same PIN at a number of proximate ATMs to withdraw funds within an hour, or the like). Additionally or alternatively, the cognitive automation platform 102 may maintain a threshold value corresponding to a number of times that a particular user interface progression may be used within a predetermined time period in a legitimate manner, and may compare the first ATM interaction information to this threshold value. For example, if the cognitive automation platform 102 determines, based on the first ATM interaction information, that the threshold value is exceeded, the cognitive automation platform 102 may identify a security threat. In some instances, the cognitive automation platform 102 may further identify that these various ATMs are within a predetermined distance of each other (e.g., a malicious user is performing the same activity at a number of proximate ATMs within an hour, or the like). Additionally or alternatively, the cognitive automation platform 102 may maintain a threshold withdrawal limit, above which an enterprise user device 104 is notified of the withdrawal, withdrawals are limited to a predetermined number, or the like, and the cognitive automation platform 102 may compare the first ATM interaction information to this threshold withdrawal limit. If the cognitive automation platform 102 determines that an amount of funds is below, but within a threshold amount of, the threshold withdrawal limit, more than a predetermined number of times, the cognitive automation platform 102 may identify a security threat (e.g., a malicious user is attempting to remain undetected and/or unrestricted by circumventing maximum withdrawal limits, or the like). Additionally or alternatively, the cognitive automation platform 102 may maintain a threshold amount of time that a user may be present at the first ATM 105 without interacting with the first ATM 105 before being flagged as suspicious (e.g., a user is just loitering at the first ATM 105). If the cognitive automation platform 102 determines that a user has been present for more an amount of time greater than the threshold amount of time and has not interacted with the first ATM, the cognitive automation platform 102 may identify a security threat.

In some instances, the cognitive automation platform 102 may maintain profiles for legitimate users (which may, in some instances, be tied to an account number). In these instances, the cognitive automation platform 102 may apply computer vision techniques to the first image data to compare an identified user to a legitimate user. In these instances, the cognitive automation platform 102 may identify the legitimate user based on a PIN number received at the first ATM 105. Similarly, the cognitive automation may compare audio from the first image data to compare an identified user to a legitimate user (e.g., using voice recognition). If the cognitive automation platform 102 determines that the identified user does not match the legitimate user, the cognitive automation platform 102 may identify a security threat.

In some instances, if a security threat is identified, the cognitive automation platform 102 may generate and maintain a profile for the malicious user (e.g., the first user) that includes image data (e.g., the first image data) and/or ATM interaction data (e.g., the first ATM interaction information) corresponding to the first user. In doing so, the cognitive automation platform 102 may be able to identify the first user at subsequent ATMs based on received ATM interaction information. In some instances, the cognitive automation platform 102 may format user profiles, image data, and/or ATM interaction information into a common protocol for intake by various enterprise devices (e.g., ATMs, user devices, or the like corresponding to the same or different enterprise organizations).

At step 209, the cognitive automation platform 102 may generate one or more commands directing the first ATM 105 to perform one or more security actions. For example, the cognitive automation platform 102 may generate one or more commands directing the first ATM 105 to cause display of one or more graphical user interfaces to be displayed at the first ATM 105, which may delay the user from completing a malicious activity. Additionally or alternatively, the cognitive automation platform 102 may generate one or more commands directing the first ATM 105 to lock. At step 210, the cognitive automation platform 102 may send the one or more commands directing the first ATM 105 to perform the one or more security actions, generated at step 209, to the first ATM 105. In some instances, the cognitive automation platform 102 may send the one or more commands directing the first ATM 105 to perform the one or more security actions via the communication interface 113 and while the first wireless data connection is established.

At step 211, the first ATM 105 may receive the one or more commands directing the first ATM 105 to perform the one or more security actions. In some instances, the first ATM 105 may receive the one or more commands directing the first ATM 105 to perform the one or more security actions while the first wireless data connection is established.

Figure 2C:
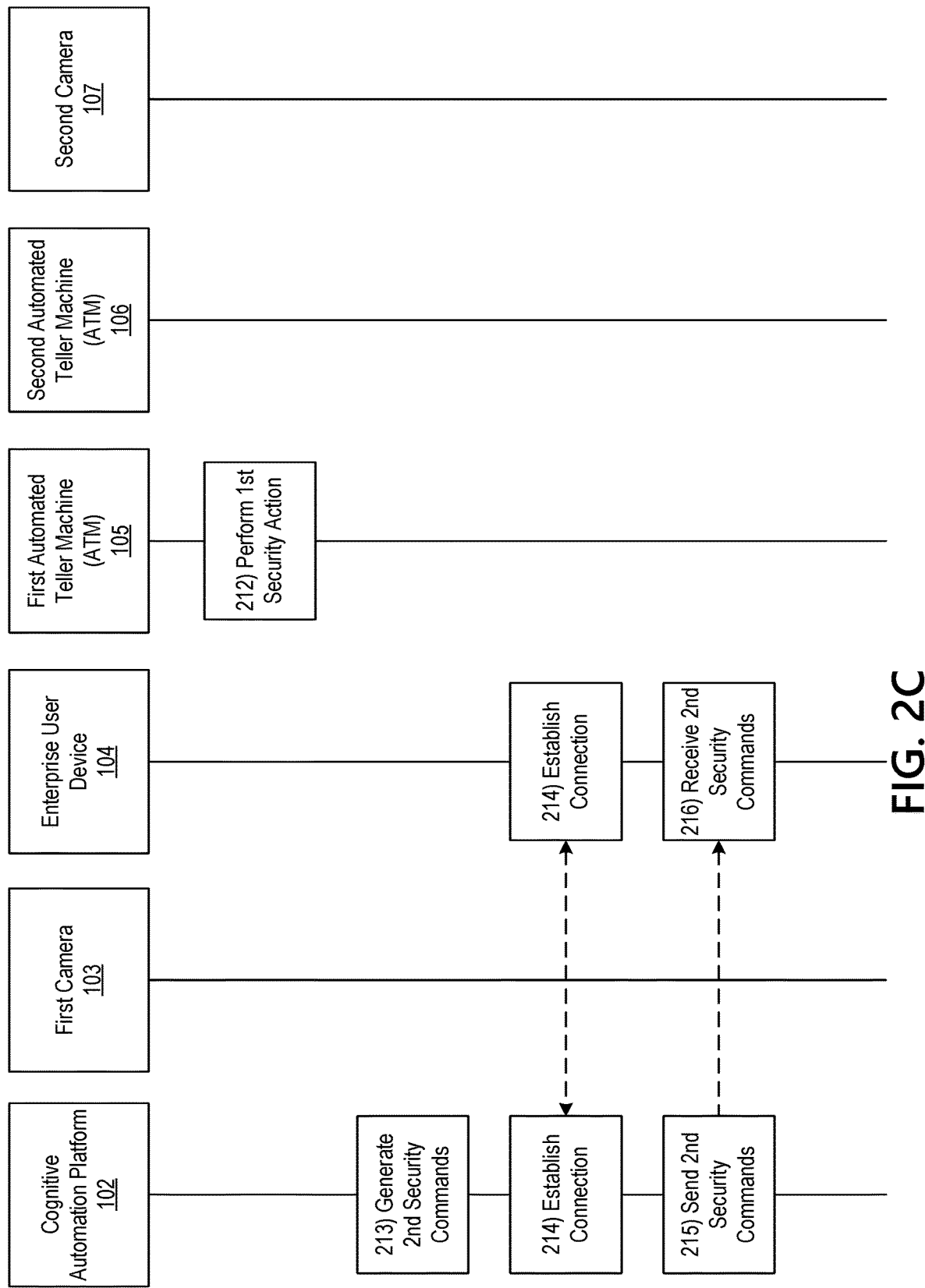

Referring to FIG. 2C, at step 212, the first ATM 105 may perform, in response to receiving the one or more commands directing the first ATM 105 to perform the one or more security actions, the one or more security actions. For example, the first ATM 105 may cause display of a user interface similar to graphical user interfaces 305 and/or 405, which are shown in FIGS. 3 and 4 respectively. For example, the first ATM 105 may display a graphical user interface providing a different withdrawal amount than was requested by the first user. For example, the first ATM 105 may have received a request to make a $500 deposit, but may indicate that a request for $5 was received, and may ask the first user to confirm. Additionally or alternatively, the first ATM 105 may simply dispense this alternative amount of money (e.g., the $5). Additionally or alternatively, the first ATM 105 may display a graphical user interface indicating that a transaction error occurred and prompting the first user to try again. In doing so, the first ATM 105 may delay the first user while the cognitive automation platform 102 sends alerts, notifications, or the like (e.g., to employees of the enterprise organization, security personnel, law enforcement, or the like).

At step 213, the cognitive automation platform 102 may generate one or more commands directing enterprise user device 104 and/or a law enforcement computing device to display a security notification. Additionally or alternatively, the cognitive automation platform 102 may generate one or more commands directing a physical perimeter surrounding the first ATM to be locked down. In some instances, the cognitive automation platform may generate the one or more commands directing enterprise user device 104 to display a security notification in response to determining that a branch of the enterprise organization maintaining the first ATM 105 is within a predetermined distance of the first ATM 105.

At step 214, the cognitive automation platform 102 may establish a connection with enterprise user device 104. In some instances, the cognitive automation platform 102 may establish a third wireless data connection with enterprise user device 104 to link the cognitive automation platform 102 to the enterprise user device 104. In some instances, the cognitive automation platform 102 may identify whether a connection is already established with the enterprise user device 104. If a connection is already established with the enterprise user device 104, the cognitive automation platform 102 might not re-establish the connection. If a connection is not already established with the enterprise user device 104, the cognitive automation platform 102 may establish the third wireless data connection as described herein.

At step 215, the cognitive automation platform 102 may send the one or more commands directing enterprise user device 104 to display a security notification. In some instances, the cognitive automation platform 102 may send the one or more commands directing enterprise user device to display the security notification via the communication interface 113 and while the third wireless data connection is established.

At step 216, the enterprise user device 104 may receive the one or more commands directing enterprise user device 104 to display a security notification. In some instances, the enterprise user device 104 may receive the one or more commands directing enterprise user device 104 to display a security notification while the third wireless data connection is established.

Figure 2D:
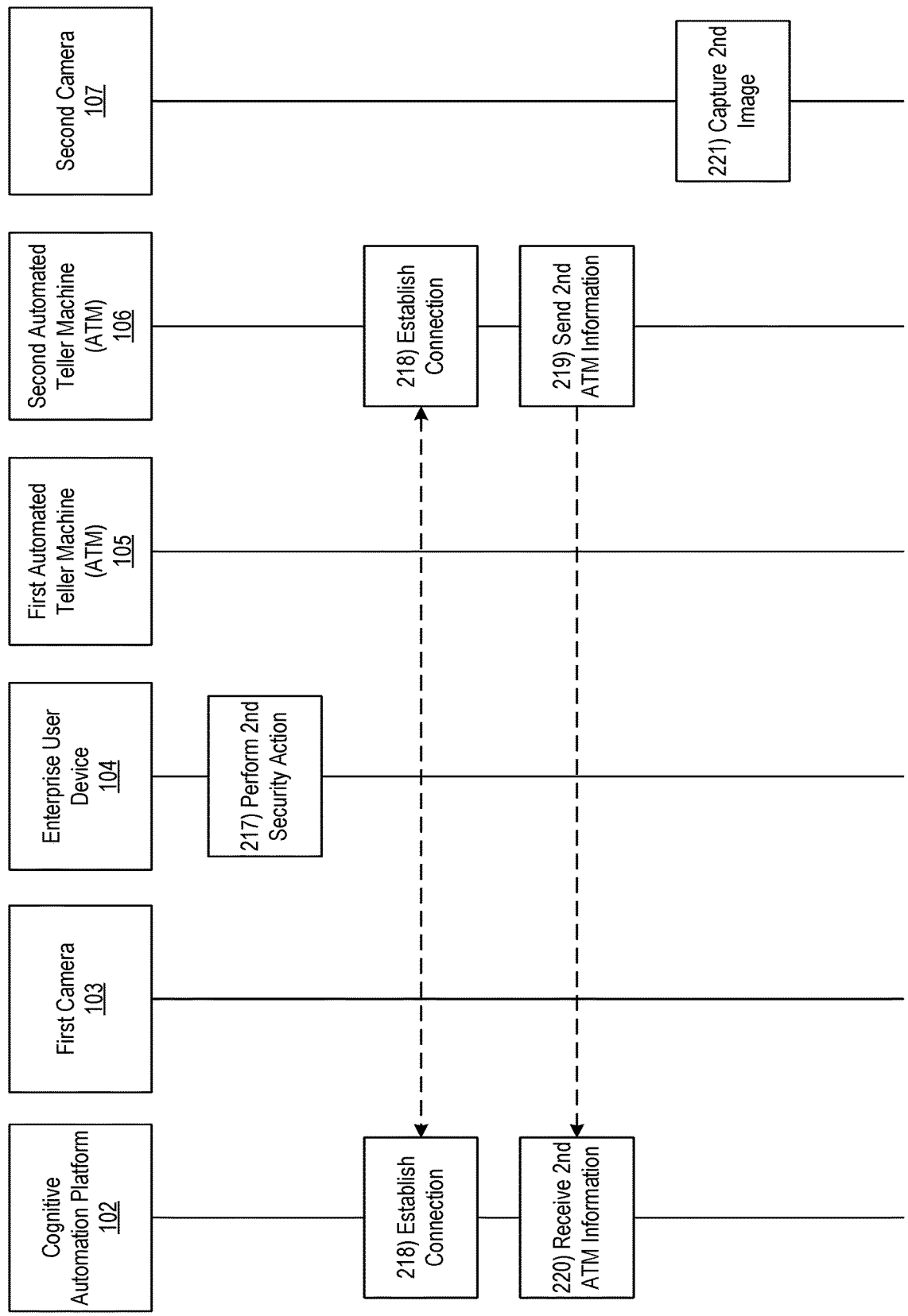

Referring to FIG. 2D, at step 217, the enterprise user device 104 may perform a second security action in response to receiving the one or more commands directing enterprise user device 104 to display a security notification. For example, the enterprise user device 104 may display a user interface similar to graphical user interface 505, which is shown in FIG. 5. For example, the enterprise user device 104 may present an interface that notifies an employee of the enterprise organization of the detected tampering and/or presents options to perform additional security actions such as notify an authority, view an image of the first user (e.g., based on the first image data), or the like. Although steps 214-217 are primarily described with regard to the enterprise user device 104, they may additionally or alternatively be performed at a law enforcement device, security control device, or the like.

At step 218, the second ATM 106 may establish a connection with cognitive automation platform 102. For example, the second ATM 106 may establish a fourth wireless data connection with cognitive automation platform 102 to link the second ATM 106 to the cognitive automation platform 102. In some instances, the second ATM 106 may identify whether a connection is already established with the cognitive automation platform 102. If a connection is already established with the cognitive automation platform 102, the second ATM 106 might not re-establish the connection. If a connection is not yet established with the cognitive automation platform 102, the second ATM 106 may establish the fourth wireless data connection as described herein.

At step 219, the second ATM 106 may send second ATM interaction information to the cognitive automation platform 102. In some instances, the second ATM may send the second ATM interaction information to the cognitive automation platform 102 while the fourth wireless data connection is established. For example, the second ATM 106 may send information corresponding to an interaction between the first user (e.g., who previously interacted with the first ATM 105) and the second ATM 106 (e.g., the first user has moved now to another ATM, which may correspond to the same enterprise organization as first ATM 105, or a different enterprise organization). Actions performed at step 219 may be similar to those described above at step 202 with regard to the first ATM 105.

At step 220, the cognitive automation platform 102 may receive the second ATM interaction information sent at step 219. In some instances, the cognitive automation platform 102 may receive the second ATM interaction information via the communication interface and while the fourth wireless data connection is established. Actions performed at step 220 may be similar to those described above at step 203 with regard to the first ATM interaction information.

At step 221, the second camera 107 may capture a second image. In some instances, the second camera 107 may be configured to capture images of a user interacting with the second ATM 106. In some instances, the second camera 107 may capture images at a predetermined interval (e.g., once a minute, or the like). In other instances, the second camera 107 may receive one or more commands from the cognitive automation platform 102, which may indicate that tampering has been detected (e.g., based on the second ATM interaction information, and that an image should be captured). In some instances, the second camera 107 may capture video content, images, audio content, or the like corresponding to the first user. Actions performed at step 221 may be similar to those described above with regard to step 204.

Figure 2E:
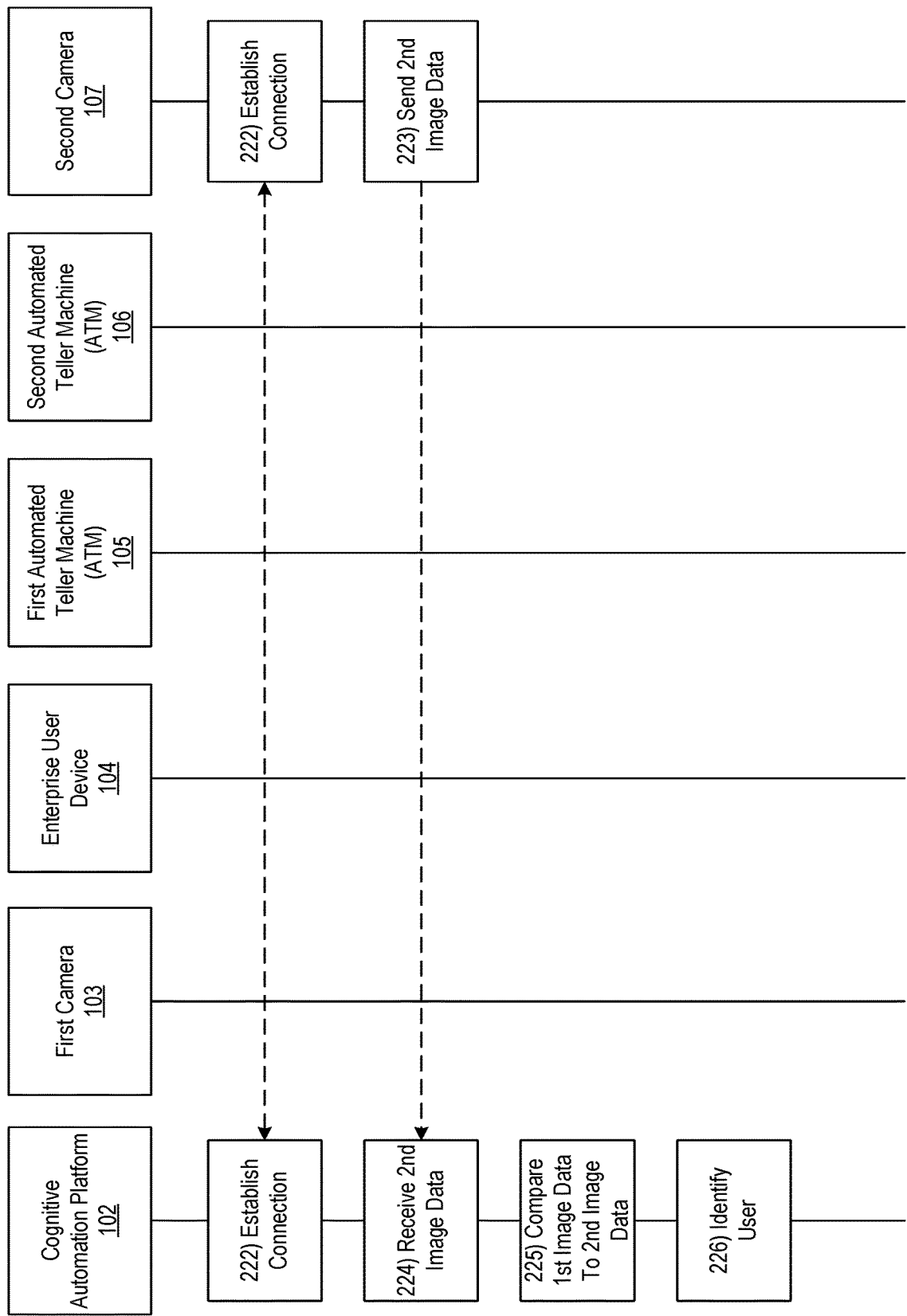

Referring to FIG. 2E, at step 222, second camera 107 may establish a connection with cognitive automation platform 102. In some instances, the second camera 107 may establish a fifth wireless data connection with the cognitive automation platform 102 to link the second camera 107 to the cognitive automation platform 102. In some instances, the second camera 107 may identify whether a connection is already established with the cognitive automation platform 102. If a connection is already established with the cognitive automation platform 102, the second camera 107 might not re-establish the connection. If a connection is not yet established with the cognitive automation platform 102, the second camera 107 may establish the fifth wireless data connection as described herein.

At step 223, the second camera 107 may send second image data to the cognitive automation platform 102. In some instances, the second camera 107 may send the second image data to the cognitive automation platform 102 while the fifth wireless data connection is established. In some instances, the second camera 107 may send second image data corresponding to the first user interacting with the second ATM 106. In some instances, the second camera 107 may send video data, audio data, image data, or the like to the cognitive automation platform 102. In some instances, in sending the second image data to the cognitive automation platform 102, the second camera 107 may establish a live video stream between the first camera 103 and the cognitive automation platform 102. Actions performed at step 223 may be similar to those described above at step 206 with regard to the first camera 103.

At step 224, the cognitive automation platform 102 may receive the second image data sent at step 223. In some instances, the cognitive automation platform 102 may receive the second image data via the communication interface 113 and while the fifth wireless data connection is established. In some instances, the cognitive automation platform 102 may receive second image data corresponding to the first user interacting with the second ATM 106. In some instances, the cognitive automation platform 102 may receive video data, audio data, image data, or the like from the second camera 107. In some instances, in receiving the second image data, the cognitive automation platform 102 may receive a live video stream from the second camera 107. It should be understood that, in some instances, steps 218-224 may occur concurrently (e.g., second ATM interaction information and second image data may be collected and sent to the cognitive automation platform 102 simultaneously). Furthermore, it should be understood that although a single camera is described, multiple cameras may be implemented to collect images of the first user from multiple vantage points.

At step 225, the cognitive automation platform 102 may compare the first image data, received at step 207, to the second image data, received at step 224. For example, the cognitive automation platform 102 may apply computer vision methods to analyze the two sets of image data and generate an image comparison score.

At step 226, the cognitive automation platform 102 may compare the comparison score, computed at step 225, to a predetermined comparison threshold. If the cognitive automation platform 102 identifies that the comparison score exceeds the comparison threshold, the cognitive automation platform 102 may identify that the user interacting with the second ATM 106 is the same user that interacted with the first ATM 105 (e.g., which is the first user).

Figure 2F:
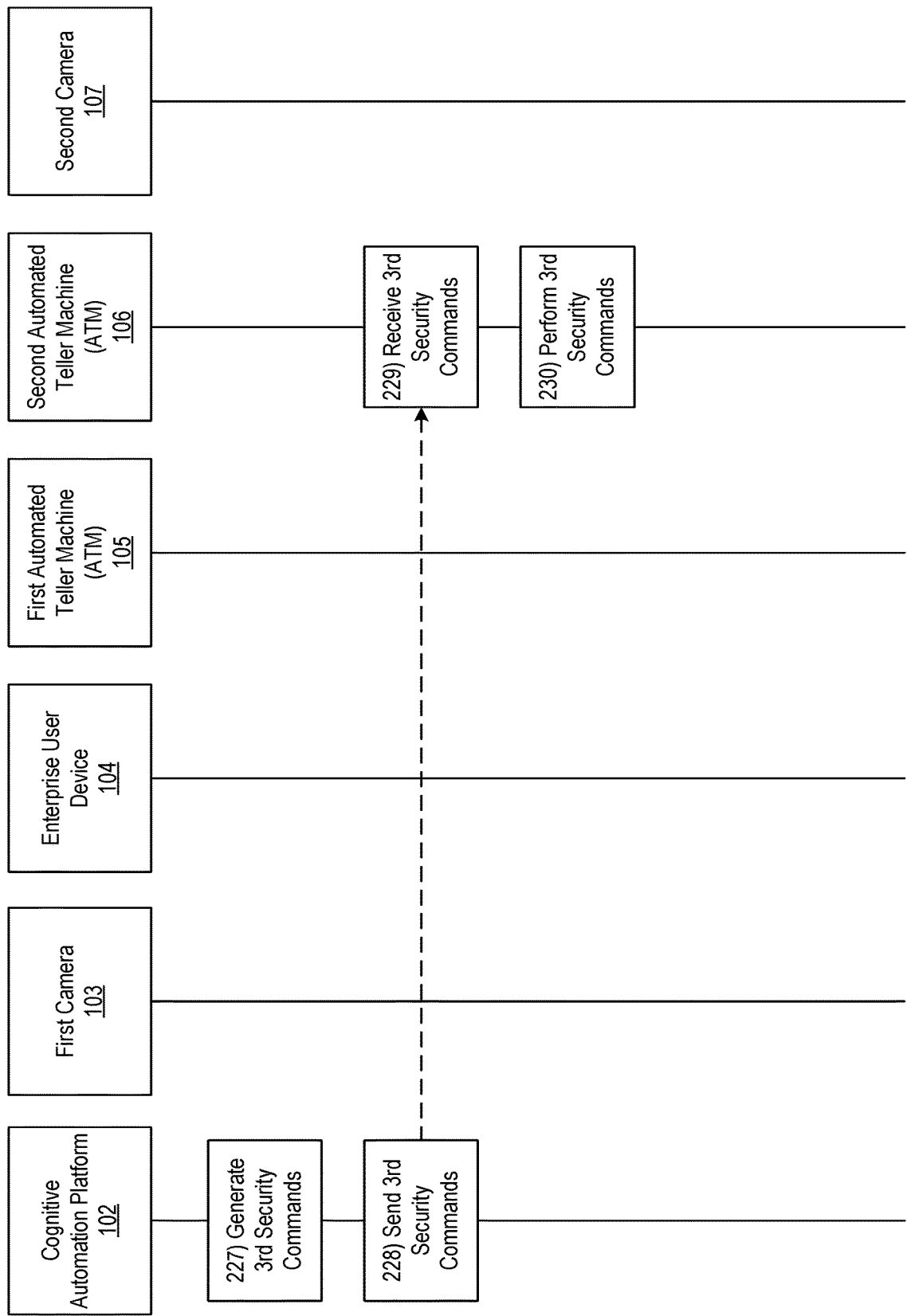

Referring to FIG. 2F, at step 227, the cognitive automation platform 102 may generate one or more commands directing the second ATM 106 to perform one or more security actions. For example, the cognitive automation platform 102 may generate one or more commands directing the second ATM 106 to cause display of one or more graphical user interfaces to be displayed at the second ATM 106, which may delay the first user from completing a malicious activity. Additionally or alternatively, the cognitive automation platform 102 may generate one or more commands directing the second ATM 106 to lock. Action performed at step 227 may be similar to those described above with regard to step 209.

At step 228, the cognitive automation platform 102 may send the one or more commands directing the second ATM 106 to perform the one or more security actions, generated at step 228, to the second ATM 106. In some instances, the cognitive automation platform 102 may send the one or more commands directing the second ATM 106 to perform the one or more security actions via the communication interface 113 and while the fourth wireless data connection is established. Actions performed at step 228 may be similar to those described above with regard to step 210.

At step 229, the second ATM 106 may receive the one or more commands directing the second ATM 106 to perform the one or more security actions. In some instances, the second ATM 106 may receive the one or more commands directing the second ATM 106 to perform the one or more security actions while the fourth wireless data connection is established. Actions performed at step 230 may be similar to those described above with regard to step 211.

At step 230, the second ATM 106 may perform, in response to receiving the one or more commands directing the second ATM 106 to perform the one or more security actions, the one or more security actions. For example, the second ATM 106 may cause display of a user interface similar to graphical user interfaces 305 and/or 405, which are shown in FIGS. 3 and 4 respectively. For example, the second ATM 106 may display a graphical user interface providing a different withdrawal amount than was requested by the first user. For example, the second ATM 106 may have received a request to make a $500 deposit, but may indicate that a request for $5 was received, and ask the first user to confirm. Additionally or alternatively, the second ATM 106 may simply dispense this alternative amount of money (e.g., the $5). Additionally or alternatively, the second ATM 106 may display a graphical user interface indicating that a transaction error occurred and prompting the first user to try again. In doing so, the second ATM 106 may delay the first user while the cognitive automation platform 102 sends alerts, notifications, or the like (e.g., to employees of the enterprise organization, law enforcement, or the like). Actions performed at step 230 may be similar to those described above with regard to step 212. It should be understood that actions described above in steps 213-217 may similarly be performed herein with regard to the second ATM 106.

Figure 6:
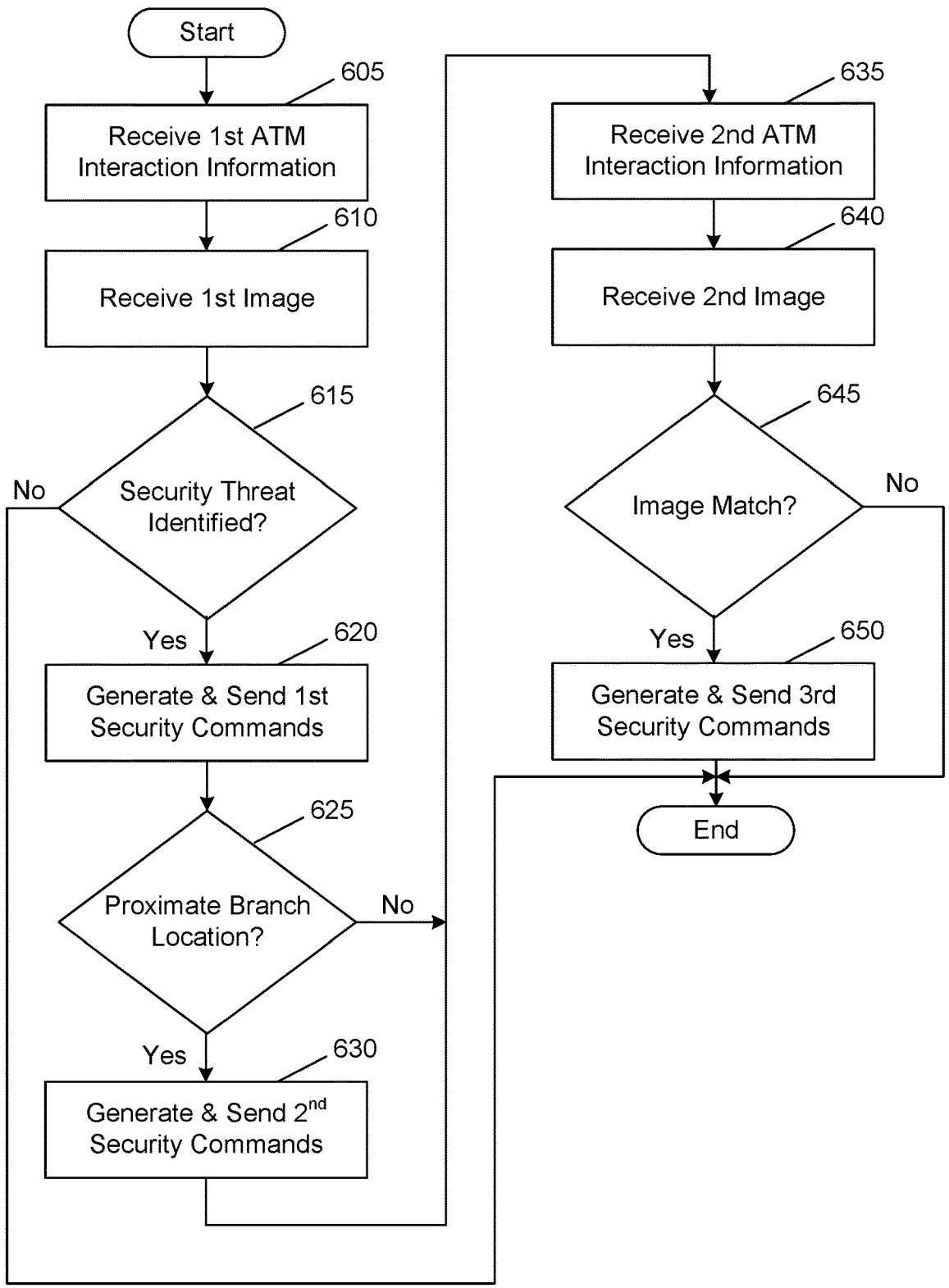
FIG. 6 depicts an illustrative method for implementing cognitive automation techniques for enhanced ATM security in accordance with one or more example embodiments.

FIG. 6 depicts an illustrative method that implements cognitive automation for enhanced ATM security in accordance with one or more example embodiments. Referring to FIG. 6, at step 605, a computing platform having at least one processor, a communication interface, and memory may receive first ATM interaction information corresponding to an interaction between a user and a first ATM. At step 610, the computing platform may receive first image data from a first camera corresponding to a first image of the user. At step 615, the computing platform may analyze the first ATM interaction information and the first image data using a cognitive automation model to identify whether the user is interacting maliciously with the first ATM. If the user is not interacting maliciously with the first ATM, the method may end. If the user is interacting maliciously with the first ATM, the computing platform may proceed to step 620.

At step 620, the computing platform may generate and send one or more commands directing the first ATM to perform one or more security actions. At step 625, the computing platform may identify whether a branch location is within a predetermined distance of the first ATM. If a branch location is within the predetermined distance of the first ATM, the computing platform may proceed to step 630. If a branch location is not within the predetermined distance of the first ATM, the computing platform may proceed to step 635.

At step 630, the computing platform may generate and send one or more commands directing an enterprise user device to perform one or more security actions. At step 635, the computing platform may receive second ATM interaction corresponding to an interaction between the user and a second ATM. At step 640, the computing platform may receive second image data from a second camera corresponding to a second image of the user. At step 645, the computing platform may compare the first image and the second image to determine whether there is a match between the two images. If there is not a match between the two images, the method may end. If the computing platform determines that there is a match between the two images, the computing platform may proceed to step 650. At step 650, the computing platform may generate and send one or more commands directing the third ATM to perform one or more security actions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive, from a first automated teller machine (ATM), first ATM information, wherein the first ATM information indicates a first interaction between a user and the first ATM; receive, from a first camera, a first image, wherein the first image shows the user performing the first interaction with the first ATM; determine, based on the first ATM information and the first image, that the first ATM is experiencing malicious activity, wherein determining that the first ATM is experiencing malicious activity comprises determining that a same user interface progression has been accessed at a number of ATMs within a predetermined distance, wherein the number of ATMs exceeds a threshold number of ATMs, and wherein different access credentials were used to access at least two ATMs of the number of ATMs;
      send, to a second ATM, one or more commands directing the second ATM to perform a first security action, wherein sending the one or more commands directing the second ATM to perform the first security action causes the second ATM to perform the first security action; and
   wherein the first security action comprises:
      causing display of one or more graphical user interfaces to be displayed at the second ATM which may delay the user from completing the malicious activity, wherein the one or more graphical user interfaces indicate a different withdrawal amount than was requested by the user; and
      dispensing the different withdrawal amount than was requested by the user, wherein the computing platform notifies law enforcement of the malicious activity during the delay.

2. The computing platform of claim 1, wherein the memory stores additional computer-readable instructions that, when executed by the at least one processor, further cause the computing platform to:
   receive, from the second ATM, second ATM information, wherein the second ATM information indicates a second interaction between the user and the second ATM;
   receive, from a second camera, a second image, wherein the second image shows the user performing the second interaction with the second ATM; and
   compare the first image to the second image, wherein the comparison results in identifying that the user performing the second interaction is the same user that performed the first interaction.

3. The computing platform of claim 2, wherein comparing the first image to the second image comprises applying computer vision techniques to identify the user in the first image and the second image.

4. The computing platform of claim 2, wherein sending the one or more commands directing the second ATM to perform the first security action comprises sending, in response to identifying that the user performing the second interaction is the same user that performed the first interaction, the one or more commands directing the second ATM to perform the first security action.

5. The computing platform of claim 1, wherein receiving the first image comprises receiving, concurrently with the first ATM information, the first image, and wherein the first camera is located within a predetermined distance of the first ATM.

6. The computing platform of claim 1, wherein determining, based on the first ATM information and the first image, that the first ATM is experiencing malicious activity comprises determining one or more of:
   that a same personal identification number has been used more than a predetermined number of times during a predetermined time period, or
   that an amount of funds within a predetermined amount of a maximum withdrawal limit has been withdrawn from the number of ATMs within the predetermined distance a number of times that exceeds a predetermined withdrawal threshold.

7. The computing platform of claim 1, wherein the memory stores additional computer-readable instructions that, when executed by the at least one processor, further cause the computing platform to:
   receive, from a second camera, a second image, wherein the second image shows the user performing the first interaction with the first ATM from a different vantage point than the first image, wherein determining that the first ATM is experiencing malicious activity is further based on the second image.

8. The computing platform of claim 1, wherein determining that the first ATM is experiencing malicious activity comprises:

comparing the first image to a stored user profile corresponding to a legitimate user, and
identifying, based on the comparison of the first image to the stored user profile, that the user is not the legitimate user.

9. The computing platform of claim 1, wherein the memory stores additional computer-readable instructions that, when executed by the at least one processor, further cause the computing platform to:
receive, from the first camera, audio data, wherein the audio data includes speech from the user performing the first interaction with the first ATM, wherein determining that the first ATM is experiencing malicious activity comprises:
comparing the audio data to a stored user profile corresponding to a legitimate user, and
identifying, based on the comparison of the audio data to the stored user profile, that the user is not the legitimate user.

10. A method comprising:
at a computing platform comprising at least one processor, a communication interface, and memory:
receiving, from a first automated teller machine (ATM), first ATM information, wherein the first ATM information indicates a first interaction between a user and the first ATM;
receiving, from a first camera, a first image, wherein the first image shows the user performing the first interaction with the first ATM;
determining, based on the first ATM information and the first image, that the first ATM is experiencing malicious activity, wherein determining that the first ATM is experiencing malicious activity comprises determining that a same user interface progression has been accessed at a number of ATMs within a predetermined distance, wherein the number of ATMs exceeds a threshold number of ATMs, and wherein different access credentials were used to access at least two ATMs of the number of ATMs;
sending, to a second ATM, one or more commands directing the second ATM to perform a first security action, wherein sending the one or more commands directing the second ATM to perform the first security action causes the second ATM to perform the first security action; and
wherein the first security action comprises:
causing display of one or more graphical user interfaces to be displayed at the second ATM which may delay the user from completing the malicious activity, wherein the one or more graphical user interfaces indicate that a different withdrawal amount than was requested by the user; and
dispensing the different withdrawal amount than was request requested by the user, wherein the computing platform notifies law enforcement of the malicious activity during the delay.

11. The method of claim 10, further comprising: receiving, from the second ATM, second ATM information, wherein the second ATM information indicates a second interaction between the user and the second ATM;
receiving, from a second camera, a second image, wherein the second image shows the user performing the second interaction with the second ATM; and
comparing the first image to the second image, wherein the comparison results in identifying that the user performing the second interaction is the same user that performed the first interaction.

12. The method of claim 11, wherein comparing the first image to the second image comprises applying computer vision techniques to identify the user in the first image and the second image.

13. The method of claim 11, wherein sending the one or more commands directing the second ATM to perform the first security action comprises sending, in response to identifying that the user performing the second interaction is the same user that performed the first interaction, the one or more commands directing the second ATM to perform the first security action.

14. The method of claim 11, wherein receiving the first image comprises receiving, concurrently with the first ATM information, the first image, and wherein the first camera is located within a predetermined distance of the first ATM.

15. The method of claim 10, wherein determining, based on the first ATM information and the first image, that the first ATM is experiencing malicious activity comprises determining one or more of:
that a same personal identification number has been used more than a predetermined number of times during a predetermined time period, or
that an amount of funds within a predetermined amount of a maximum withdrawal limit has been withdrawn from the number of ATMs within the predetermined distance a number of times that exceeds a predetermined withdrawal threshold.

16. The method of claim 10, further comprising receiving, from a second camera, a second image, wherein the second image shows the user performing the first interaction with the first ATM from a different vantage point than the first image, wherein determining that the first ATM is experiencing malicious activity is further based on the second image.

17. The method of claim 10, wherein determining that the first ATM is experiencing malicious activity comprises:
comparing the first image to a stored user profile corresponding to a legitimate user, and
identifying, based on the comparison of the first image to the stored user profile, that the user is not the legitimate user.

18. One or more non-transitory computer-readable media storing instructions that, when executed by a computing platform comprising at least one processor, a communication interface, and memory, cause the computing platform to:
receive, from a first automated teller machine (ATM), first ATM information, wherein the first ATM information indicates a first interaction between a user and the first ATM;
receive, from a first camera, a first image, wherein the first image shows the user performing the first interaction with the first ATM;
determine, based on the first ATM information and the first image, that the first ATM is experiencing malicious activity, wherein determining that the first ATM is experiencing malicious activity comprises determining that a same user interface progression has been accessed at a number of ATMs within a predetermined distance, wherein the number of ATMs exceeds a threshold number of ATMs, and wherein different access credentials were used to access at least two ATMs of the number of ATMs;
send, to a second ATM, one or more commands directing the second ATM to perform a first security action, wherein sending the one or more commands directing the second ATM to perform the first security action causes the second ATM to perform the first security action; and wherein the first security action comprises:
  causing display of one or more graphical user interfaces to be displayed at the second ATM which may delay the user from completing the malicious activity, wherein the one or more graphical user interfaces indicate that a different withdrawal amount than was requested by the user; and
  dispensing the different withdrawal amount than was request requested by the user, wherein the computing platform notifies law enforcement of the malicious activity during the delay.

* * * * *